United States Patent
Rouleau et al.

(10) Patent No.: US 11,267,502 B1
(45) Date of Patent: Mar. 8, 2022

(54) STEERING COLUMN RAKE PIVOT ASSEMBLY

(71) Applicant: Steering Solutions IP Holding Corporation, Saginaw, MI (US)

(72) Inventors: James E. Rouleau, Burt, MI (US); Robert D. Maida, Pinconning, MI (US); Scott A. Stinebring, Auburn, MI (US); Jacob A. Caverly, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/035,041

(22) Filed: Sep. 28, 2020

(51) Int. Cl.
   *B62D 1/187* (2006.01)
   *B62D 1/181* (2006.01)

(52) U.S. Cl.
   CPC ............ *B62D 1/187* (2013.01); *B62D 1/181* (2013.01)

(58) Field of Classification Search
   CPC ......... B62D 1/187; B62D 1/181; B62D 1/189
   See application file for complete search history.

(56) References Cited

U.S. PATENT DOCUMENTS

| | | | | |
|---|---|---|---|---|
| 8,146,945 | B2* | 4/2012 | Born | B62D 1/181 280/775 |
| 2006/0119090 | A1* | 6/2006 | Burr | B62D 1/187 280/775 |
| 2009/0064814 | A1* | 3/2009 | Tanaka | B62D 1/181 74/493 |
| 2012/0180594 | A1* | 7/2012 | Park | B62D 1/181 74/493 |
| 2013/0233117 | A1* | 9/2013 | Read | B62D 1/181 74/493 |
| 2015/0251683 | A1* | 9/2015 | Caverly | B62D 1/181 74/493 |
| 2015/0375768 | A1* | 12/2015 | Fevre | B62D 1/181 74/493 |
| 2020/0172149 | A1* | 6/2020 | Appleyard | B62D 1/181 |

* cited by examiner

*Primary Examiner* — Drew J Brown
(74) *Attorney, Agent, or Firm* — Dickinson Wright PLLC

(57) ABSTRACT

A rake pivot assembly for a steering column assembly includes a pair of flanges spaced from each other and oriented parallel to each other, each of the flanges defining an elongated opening. The assembly also includes a pair of lower brackets, each of the lower brackets having a portion thereof fitting over one of the pair of flanges. The assembly further includes a pair of alignment bushings, each of the pair of alignment bushings at least partially disposed within one of the elongated openings and positioned between one of the lower brackets and one of the flanges. The assembly yet further includes a pair of lower bracket pins, each of the lower bracket pins extending along a pivot axis of the steering column assembly and through one of the lower brackets and through one of the flanges to couple one of the lower brackets to one of the flanges.

19 Claims, 5 Drawing Sheets

STEERING COLUMN RAKE PIVOT ASSEMBLY

BACKGROUND

The following description relates to steering column assemblies and, more particularly, to a steering column rake pivot assembly.

Automotive rake columns provide vertical adjustment of the driving position by use of a revolute joint for the steering column. The revolute joint is located proximate the forward end of a lower jacket of the steering column. Some rake columns provide an electrical actuator to change the rake position. It is economical to design power adjustable rake columns that move the column using a rake arm that does not share a common revolute axis with the steering column. The result of this design is that the length from the rake pivot axis to the rake arm connection changes during articulation. To add the required degree of freedom and solve this kinematic issue, a sliding joint may be applied.

There are two potential locations for the sliding joint. The first location is the rake revolute joint for the column. This can be enhanced from a simple revolute joint to a sliding revolute joint accommodating the length variation. The second location places the sliding joint at the rotational joint connecting the rake arm to lower jacket. This addition of a sliding motion works well with a one-piece bracket. A one-piece bracket controls the relationship of the sliding joint to the pivot joint. In the effort to make structures lighter and more cost effective, the one-piece bracket that controlled the relationship of the actuator pivot and the rake pivot has evolved to two separate brackets, an upper bracket and a lower bracket. The relationship between the pivot and the sliding joint is now a function of vehicle assembly. The locations that the individual brackets are assembled assume the location function of the former one-piece.

An additional challenge is presented in a variation of the two-bracket mounting system. Some packages have further changed the lower bracket from a single lower bracket into a two-piece lower bracket. The independent lower brackets can move relative to each other changing the available joint travel. A change in length along an arc-shaped path taken by the rake arm during actuation occurs. The horizontal motion is an unwanted motion, as the functional motion is vertical.

Although a multi-bracket arrangement works if the two mounts are synchronized and not biased, it is now possible to misassemble the steering column in the vehicle with insufficient travel in the sliding joint. This error occurs in one or two-piece lower brackets when the lower bracket is axially positioned incorrectly from its intended position. This issue can occur with one or two-piece lower brackets.

Another issue occurs with two-piece lower brackets. Relative bias between the left and right bracket reduces travel of the sliding joint. Relative bias is not possible on a one-piece lower bracket. This results in shortened travel. Two-piece lower brackets complicate the assembly in that both lower brackets must be aligned axially and pivoted to the correct assembly position as well.

SUMMARY OF THE DISCLOSURE

According to one aspect of the disclosure, a rake pivot assembly for a steering column assembly includes a pair of flanges spaced from each other and oriented substantially parallel to each other, each of the flanges defining an elongated opening, wherein an axis extending through each of the elongated openings defines a pivot axis of the steering column assembly. The rake pivot assembly also includes a pair of lower brackets, each of the lower brackets having a portion thereof fitting over one of the pair of flanges. The rake pivot assembly further includes a pair of alignment bushings, each of the pair of alignment bushings at least partially disposed within one of the elongated openings and positioned between one of the lower brackets and one of the flanges. The rake pivot assembly yet further includes a pair of lower bracket pins, each of the lower bracket pins extending along the pivot axis and through one of the lower brackets and through one of the flanges to couple one of the lower brackets to one of the flanges.

According to another aspect of the disclosure, a steering column assembly includes a lower jacket extending from a first end to a second end. The steering column assembly also includes an upper bracket operatively coupled to the lower jacket proximate the first end of the lower jacket. The steering column assembly further includes a rake actuator mechanism operatively coupled to at least one of the upper bracket and the lower jacket. The steering column assembly yet further includes a flange extending from the second end of the lower jacket, the flange defining an elongated opening. The steering column assembly also includes a lower bracket having a portion thereof fitting over the flange. The steering column assembly further includes an alignment bushing at least partially disposed within the elongated opening and positioned between the lower bracket and the flange. The steering column assembly yet further includes a lower bracket pin extending through the lower bracket and through the flange to couple the lower bracket to the flange.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, various features of a travel control system for a cam assembly are illustrated. In some embodiments, the cam assembly is employed in a steering column assembly of a vehicle. Numerous applications in a steering column assembly are contemplated.

Figure 1:
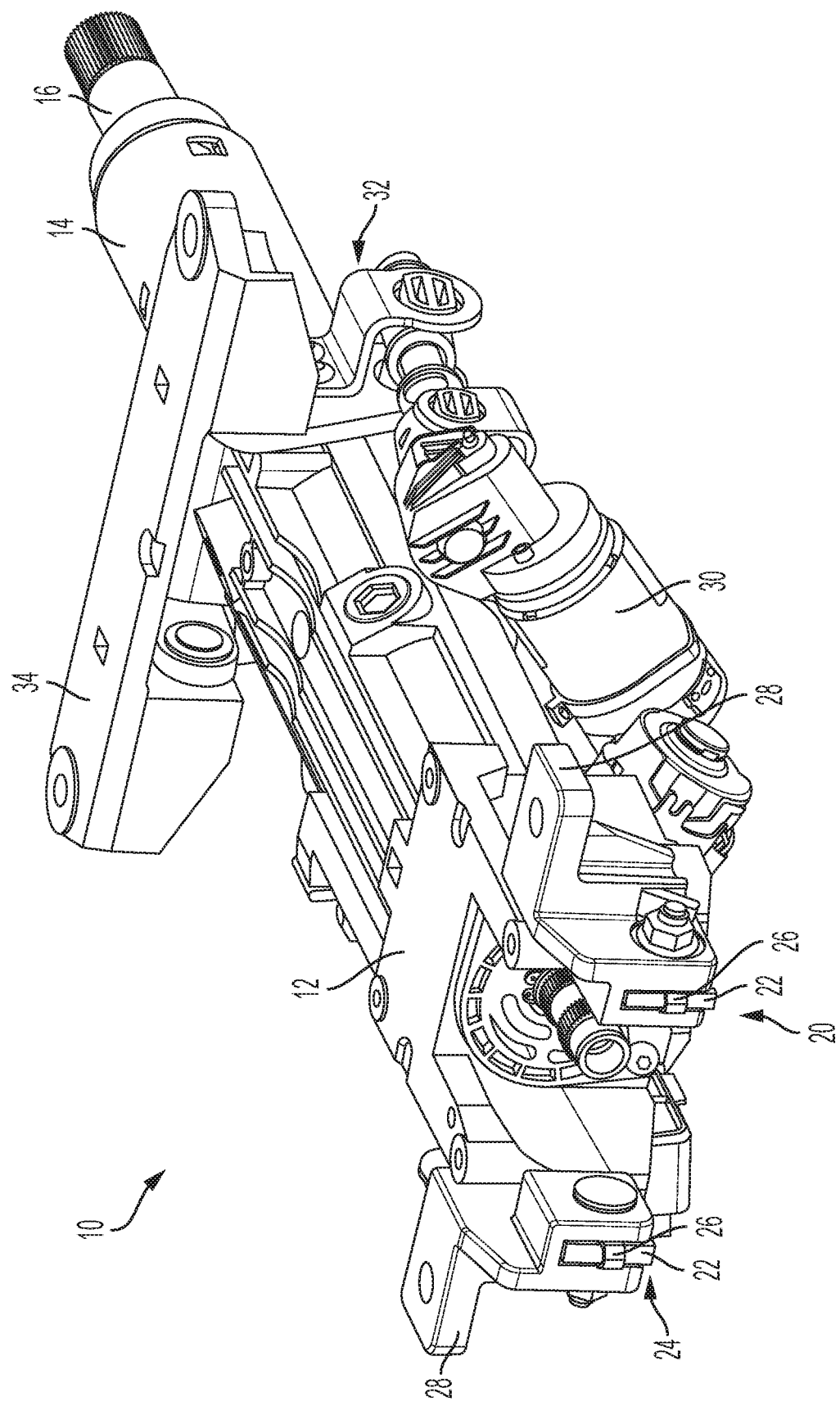
FIG. 1 is a perspective view of a portion of a steering column assembly with rake adjustment capability.

FIG. 1 illustrates a steering column assembly generally referenced with numeral 10. The steering column assembly 10 is for a vehicle and extends along a longitudinal axis. The steering column assembly 10 may be adjustable in a telescopic direction generally parallel with the longitudinal axis (i.e., adjustable along the longitudinal axis), and is adjustable in a rake/tilt direction. The steering column assembly 10 includes a lower jacket 12, an upper jacket 14, and a steering shaft 16. The steering shaft 16 and the upper jacket 14 are operatively coupled to each other and disposed in telescoping engagement with the lower jacket 12. In other words, the steering shaft 16 has a portion disposed within the upper jacket 14 and a portion disposed within the lower jacket 12. The upper jacket 14 has a portion extending into the lower jacket 12 and is translatable therein.

The overall steering column assembly 10 is able to rake/tilt about a pivot axis A. The pivoting motion is facilitated by a rake pivot assembly 20. The rake pivot assembly 20 includes a pair of flanges 22 extending from an end region 24 of the lower jacket 12. A pair of alignment bushings 26 is provided, with each of the alignment bushings 26 coupled to one of the pair of flanges 22. A pair of lower brackets 28 is provided, with each of the lower brackets 28 also coupled to one of the pair of flanges 22. A rake actuator mechanism 30 provides electrically powered rake adjustment motion via a linkage 32 that is coupled to an upper bracket 34. The upper bracket 34 and the pair of lower brackets 28 are coupled to a mounting bracket (not shown) in a fixed manner to secure the steering column assembly 10 to a structure of the vehicle.

Figure 2:
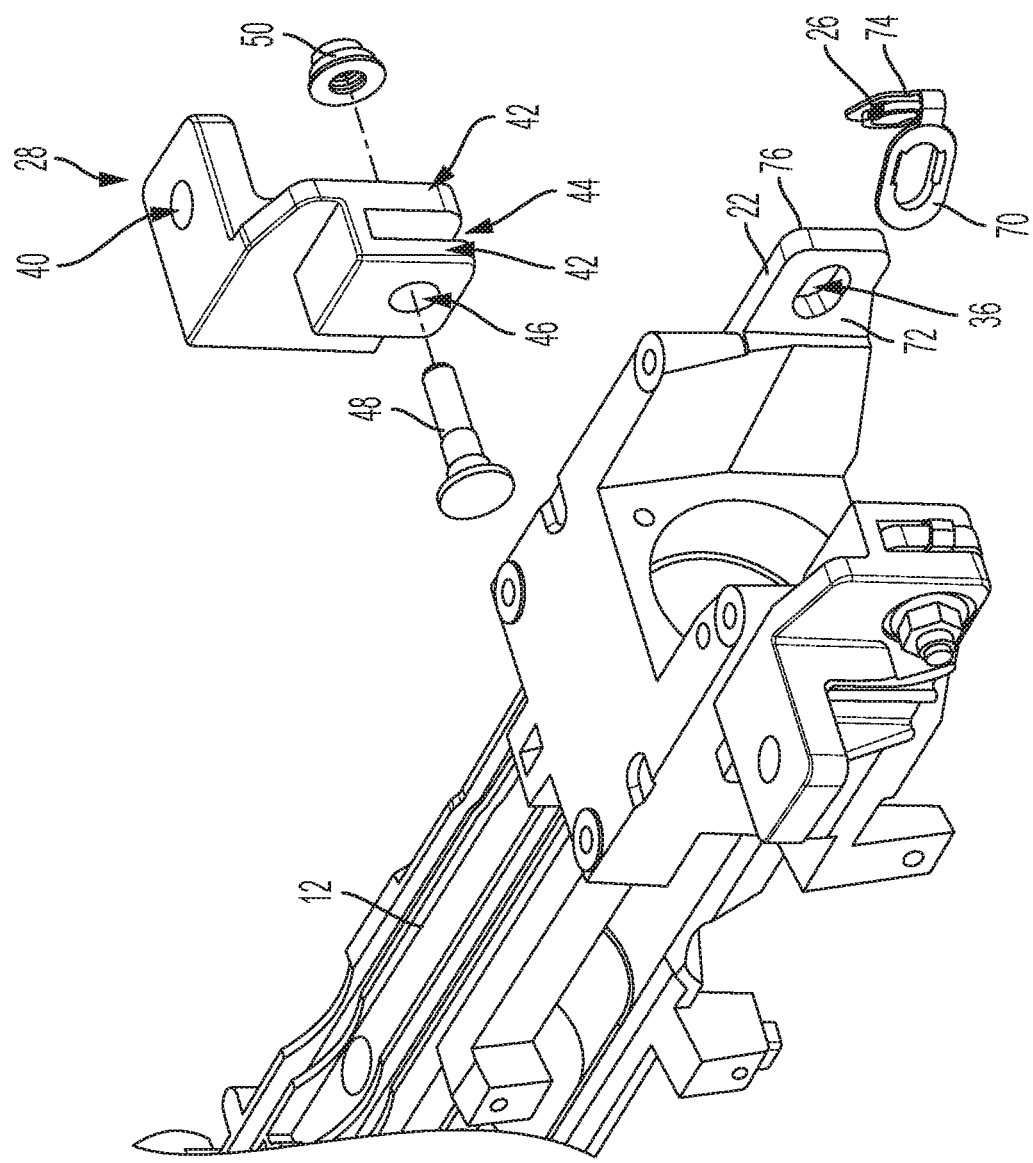
FIG. 2 is a perspective view of a rake pivot assembly of the steering column assembly.

Referring now to FIG. 2, one of the pair of flanges 22 of the lower jacket 12 is exposed via removal of the coupled components. The assembled flange side has a duplicative structure and only one side will be described in detail, such that singular description is to be understood to describe both flanges 22.

The flange 22 includes an elongated opening 36. In other words, the elongated opening 36 is not circular and is a slot-like opening or elliptical. The elongation of the opening 36 is in the longitudinal direction of the overall steering column assembly. This elongation of the opening 36 forms a sliding joint and revolute joint for the rake pivot assembly 20. The lower bracket 28 is a generally L-shaped component. One leg of the lower bracket 28 defines a hole 40 for coupling the lower bracket 28 to the mounting bracket. The other leg of the lower bracket 28 is separated into a pair of legs 42 that define a slot 44 dimensioned to receive the flange 22 therein. The pair of legs 42 each define a through hole 46. The through holes 46 and the elongated opening 36 each receive a lower bracket pin 48 therethrough. The lower bracket pin 48 is inserted from an inner face of the lower bracket 28 and protrudes through both through holes 46 to have a shoulder bolt 50 secured thereto to fix the lower bracket pin 48 to the lower bracket 28 and the flange 22.

Figure 3:
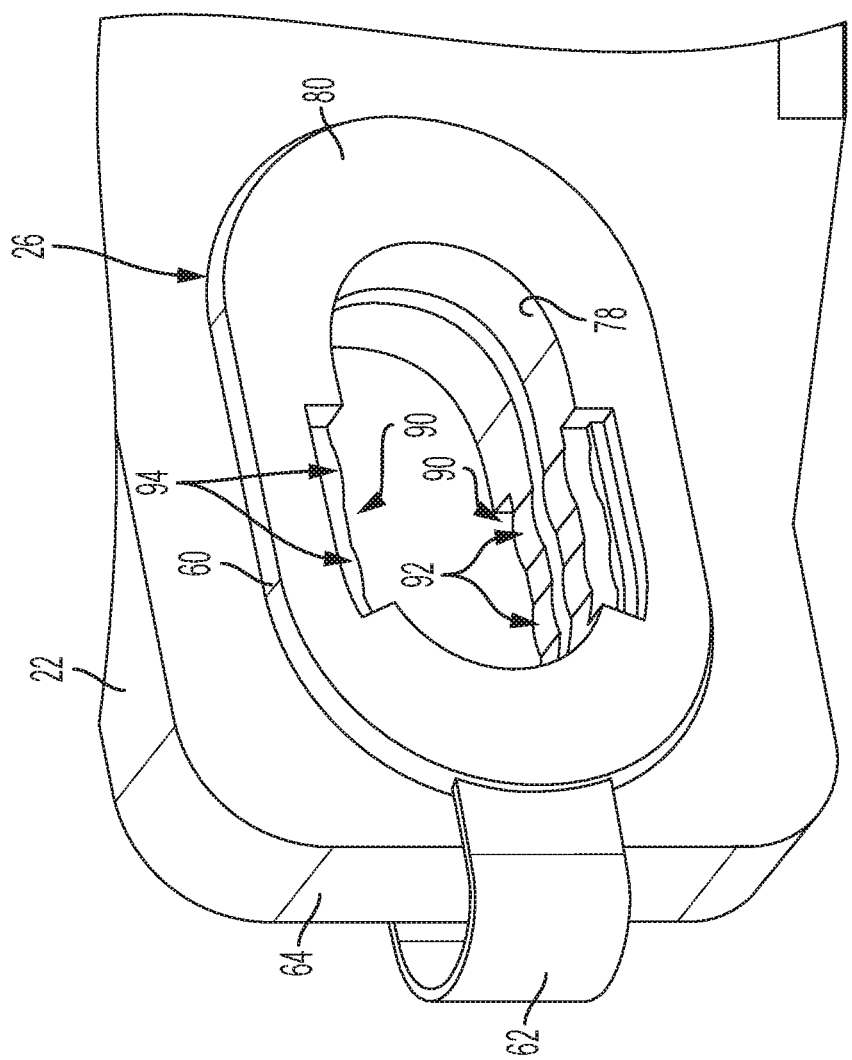
FIG. 3 is a perspective view of an alignment bushing coupled to a lower jacket of the steering column assembly.

Referring now to FIG. 3, with continued reference to FIG. 2, the alignment bushing 26 is shown in greater detail. The alignment bushing 26 includes two elliptical segments 60 that are joined by a flexible, curved strap 62. The curved strap 62 of the alignment bushing 26 is wrapped around an end 64 of the lower jacket 12. Each of the elliptical segments 60 are partially seated within the elongated opening 36 of the lower jacket 12. The elliptical segments 60 each include a planar face 68, with the planar faces 68 in contact with opposite faces of the flange 22 of the lower jacket 12. In particular, an inner elliptical segment 70 is in contact with an inner face 72 of the flange 22, while an outer elliptical segment 74 is in contact with an outer face 76 of the flange 22. When assembled to the flange 22, the alignment bushing 26 forms an annular surfaces 78 and planar surfaces 80.

The alignment bushing 26 fits within the slot 44 of the lower bracket 28. Accordingly, the alignment bushing 26 isolates the lower jacket 12 from the lower bracket 28. In particular, the alignment bushing 26 provides the annular surfaces 78 to prevent contact of the lower bracket pin 48 and the lower jacket 12. Additionally, the planar surfaces 80 of the alignment bushing provides two planes of material between the lower jacket 12 and the lower bracket 28. Therefore, the alignment bushing 26 leave no metal-to-metal contacts in the overall joint/assembly.

The alignment bushing 26 is made of a material that provides a smooth, low load, and quiet characteristics during sliding and rotational operation. In some embodiments, the alignment bushing 26 is formed of an unfilled polymer which has a low coefficient of friction. The omission of filler contributes to a quiet sliding interface as well. It is to be appreciated that alternative suitable materials may be employed in other embodiments.

In embodiments that utilize an unfilled polymer, the flexibility of the alignment bushing 26 is increased. This flexibility allows the addition of features to constrain the lower bracket pin 48 for assembly, but not for operation. In particular, a plurality of lobes 90 are formed on the annular surfaces 78 of the elliptical segments 60. Each elliptical segment 60 (i.e., inner elliptical segment 70 and outer elliptical segment 74) includes a pair of lower lobes 92 and a pair of upper lobes 94. The lobes 92, 94 are positioned such that the lower bracket pin 48 resides between the upper forward lobe, upper rearward lobe, lower forward lobe, and lower rearward lobe when the steering column assembly 10 is shipped for vehicle assembly. The structure of the lobes 92, 94 is such that the lower bracket pin 48 can deflect the lobes 92, 94 from the path of motion when the rake actuator mechanism 30 moves the steering column assembly 10. During assembly, the load to deflect the lobes 92, 94 is larger than the loads placed on the lower bracket 28 during the assembly process.

Figure 5:
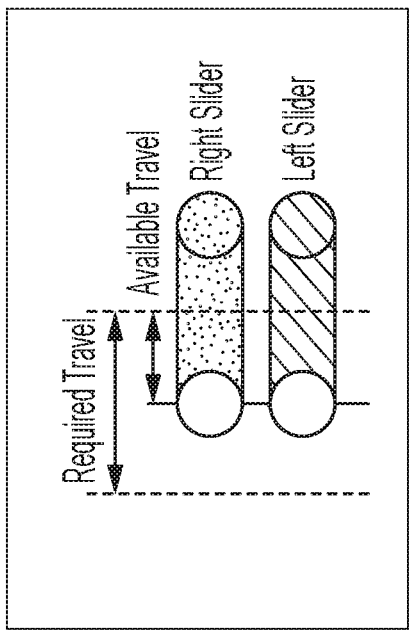
FIGS. 5-7 schematically represent various travel situations of a bracket pin during a rake adjustment motion in different assemblies.
Figure 6:
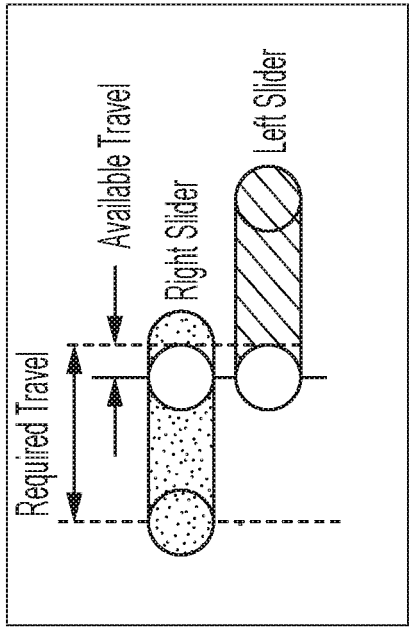
Figure 7:
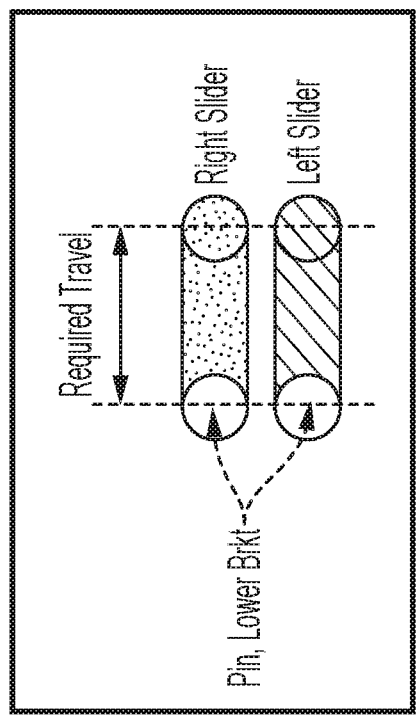

As described above, the elliptical segments 60 of the alignment bushing 26 are joined by the curved strap 62. The elliptical segments 60 and the curved strap 62 are integrally formed as a single component. The curved strap 62 ensures that the alignment bushing 26 can only fit on the flange 22 of the lower jacket 12 in one orientation. This prevents off-center build locations from being reversed during assembly. This error proofing ensures that differential bias of a two-lower bracket system does not occur. FIGS. 5 and 6 illustrate potential negative consequences of such an error, while FIG. 7 shows proper assembly that is ensured by the alignment bushing 26.

Figure 4:
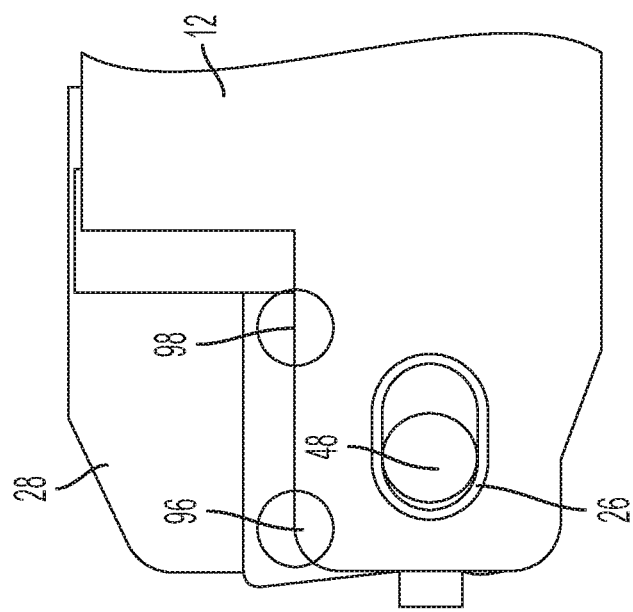
FIG. 4 is a side view of the rake pivot assembly illustrating constrained rotational motion of a lower bracket of the rake pivot assembly.

Reference is now made to FIG. 4. To further assist with the installation of the steering column assembly 10 in the vehicle, the rotary motion of the lower bracket 28 is constrained by a first surface 96 and a second surface 98 on the lower jacket 12. The first surface 96 contacts the lower bracket 28 to limit excess clockwise motion. The second surface 98 contacts the lower bracket 28 to limit excess counter-clockwise motion, as shown. This prevents the lower bracket 28 from misalignments of angles greater than approximately 5 degrees in some embodiments. This potential metal-to-metal contact can only occur prior to installation, as the steering column assembly 10 cannot be adjusted to make contact after installation.

While the invention has been described in detail in connection with only a limited number of embodiments, it should be readily understood that the invention is not limited to such disclosed embodiments. Rather, the invention can be modified to incorporate any number of variations, altera-

Having thus described the invention, it is claimed:

1. A rake pivot assembly for a steering column assembly comprising:
   a pair of flanges spaced from each other and oriented substantially parallel to each other, each of the flanges defining an elongated opening, wherein an axis extending through each of the elongated openings defines a pivot axis of the steering column assembly;
   a pair of lower brackets, each of the lower brackets having a portion thereof fitting over one of the pair of flanges;
   a pair of alignment bushings, each of the pair of alignment bushings at least partially disposed within one of the elongated openings and positioned between one of the lower brackets and one of the flanges; and
   a pair of lower bracket pins, each of the lower bracket pins extending along the pivot axis and through one of the lower brackets and through one of the flanges to couple one of the lower brackets to one of the flanges.

2. The rake pivot assembly of claim 1, wherein each of the pair of alignment bushings comprises a first elliptical segment, a second elliptical segment, and a strap connecting the first and second elliptical segments.

3. The rake pivot assembly of claim 2, wherein each of the pair of alignment bushings is a single, integrally formed component.

4. The rake pivot assembly of claim 2, wherein each of the pair of alignment bushings comprises an inner elliptical segment and an outer elliptical segment, the inner elliptical segment in contact with an inner face of one of the flanges, the outer elliptical segment in contact with an outer face of one of the flanges.

5. The rake pivot assembly of claim 4, wherein each of the alignment bushings forms an annular surface and a pair of planar surfaces.

6. The rake pivot assembly of claim 5, wherein the annular surface is disposed between the lower bracket pin and the flange to prevent contact of the lower bracket pin and the flange.

7. The rake pivot assembly of claim 5, wherein the planar surfaces of the alignment bushing is disposed between the flange and the lower bracket to prevent contact of the flange and the lower bracket.

8. The rake pivot assembly of claim 5, wherein the annular surface comprises a plurality of lobes disposed thereon.

9. The rake pivot assembly of claim 8, wherein the plurality of lobes comprises an upper pair of lobes and a lower pair of lobes, the lower bracket pin disposed between the upper pair of lobes and the lower pair of lobes.

10. The rake pivot assembly of claim 1, wherein each of the pair of alignment bushings is formed of an unfilled polymer.

11. A steering column assembly comprising:
    a lower jacket extending from a first end to a second end;
    an upper bracket operatively coupled to the lower jacket proximate the first end of the lower jacket;
    a rake actuator mechanism operatively coupled to at least one of the upper bracket and the lower jacket;
    a flange extending from the second end of the lower jacket, the flange defining an elongated opening;
    a lower bracket having a portion thereof fitting over the flange;
    an alignment bushing at least partially disposed within the elongated opening and positioned between the lower bracket and the flange; and
    a lower bracket pin extending through the lower bracket and through the flange to couple the lower bracket to the flange.

12. The steering column assembly of claim 11, wherein the alignment bushing comprises a first elliptical segment, a second elliptical segment, and a strap connecting the first and second elliptical segments.

13. The steering column assembly of claim 12, wherein the alignment bushing comprises an inner elliptical segment and an outer elliptical segment, the inner elliptical segment in contact with an inner face of the flange, the outer elliptical segment in contact with an outer face of the flange.

14. The steering column assembly of claim 13, wherein the alignment bushing forms an annular surface and a pair of planar surfaces.

15. The steering column assembly of claim 14, wherein the annular surface is disposed between the lower bracket pin and the flange to prevent contact of the lower bracket pin and the flange.

16. The steering column assembly of claim 14, wherein the planar surfaces of the alignment bushing is disposed between the flange and the lower bracket to prevent contact of the flange and the lower bracket.

17. The steering column assembly of claim 14, wherein the annular surface comprises a plurality of lobes disposed thereon.

18. The steering column assembly of claim 17, wherein the plurality of lobes comprises an upper pair of lobes and a lower pair of lobes, the lower bracket pin disposed between the upper pair of lobes and the lower pair of lobes.

19. The steering column assembly of claim 11, wherein the lower bracket includes a pair of downwardly extending legs defining a slot therebetween, the flange disposed within the slot.

* * * * *